United States Patent [19]

Casellato

[11] Patent Number: 5,133,563
[45] Date of Patent: Jul. 28, 1992

[54] TWO RING PISTON WITH LOWER TAPERED L-SHAPED RING

[75] Inventor: Rino Casellato, Torino, Italy

[73] Assignee: Borgo-Nova SpA, Turin, Italy

[21] Appl. No.: 639,744

[22] Filed: Jan. 11, 1991

Related U.S. Application Data

[63] Continuation of Ser. No. 420,379, Oct. 12, 1989.

[30] Foreign Application Priority Data

Nov. 4, 1988 [IT] Italy ................... 67986 A/88

[51] Int. Cl.$^5$ ............................................. F16J 9/12
[52] U.S. Cl. .................................. 277/168; 277/170; 277/173; 277/214
[58] Field of Search .......................... 277/236; 92/158

[56] References Cited

U.S. PATENT DOCUMENTS

| | | | |
|---|---|---|---|
| 1,368,447 | 2/1921 | Megson | 277/214 |
| 1,380,454 | 6/1921 | Wilson | 277/218 X |
| 1,579,043 | 3/1926 | Wester | 277/214 |
| 1,584,873 | 5/1926 | Latta | 277/214 |
| 1,614,602 | 1/1927 | Day | 277/214 |
| 2,318,543 | 5/1943 | Thorn | 277/214 |
| 2,387,855 | 10/1945 | Phillips | 277/216 |
| 2,431,796 | 12/1947 | Fall | 277/216 X |
| 2,459,395 | 1/1949 | Smith | 277/216 |
| 2,566,603 | 9/1951 | Dykes | 277/173 |
| 2,715,555 | 8/1955 | Marien | 277/173 |
| 2,927,831 | 3/1960 | Tuczek | 277/168 |
| 2,970,023 | 1/1961 | Thompson | 277/216 |
| 3,554,568 | 1/1971 | Heid, Jr. | 277/120 |
| 3,834,719 | 9/1974 | Shin et al. | 277/170 |
| 3,862,480 | 1/1975 | Packard et al. | 277/216 |
| 3,926,166 | 12/1975 | Packard . | |
| 4,346,685 | 8/1982 | Fujikawa | 277/170 |
| 4,409,947 | 10/1983 | Yanagihara et al. | 123/193 P X |
| 4,669,369 | 6/1987 | Holt et al. | 123/193 P X |
| 4,694,734 | 9/1987 | Nomura et al. | 277/139 X |
| 4,741,543 | 5/1988 | Geffroy et al. | 277/139 X |

FOREIGN PATENT DOCUMENTS

| | | | |
|---|---|---|---|
| 408044 | 2/1935 | Belgium . | |
| 653720 | 2/1958 | Canada | 277/207 |
| 885625 | 6/1953 | Fed. Rep. of Germany | 277/120 |
| 2003205 | 7/1971 | Fed. Rep. of Germany | 277/216 |
| 491682 | 6/1919 | France . | |
| 721633 | 3/1932 | France | 277/174 |
| 1396938 | 3/1965 | France | 277/216 |
| 580393 | 11/1977 | U.S.S.R. | 277/216 |
| 424646 | 2/1935 | United Kingdom . | |
| 448916 | 6/1936 | United Kingdom | 277/218 |
| 630656 | 10/1949 | United Kingdom . | |
| 756150 | 8/1956 | United Kingdom . | |
| 1091364 | 11/1967 | United Kingdom . | |

OTHER PUBLICATIONS

"Seals and Sealing Handbook": pp. 200–201, 291–292, published 1981.
H. Hugo Buchter, "Industrial Sealing Technology": pp. 376–377, published 1979.
"Handbook of Mechanical Packings and Gasket Mateials": p. 6, published 1961.

Primary Examiner—Allan N. Shoap
Assistant Examiner—Scott W. Cummings
Attorney, Agent, or Firm—William R. Hinds

[57] ABSTRACT

Piston rings for internal combustion engines and compressors are described. The piston ring comprises a generally "L-shaped" cross section and may be used in place of a conventional oil control piston ring. It may fulfill an exclusively oil scraping function or may act as a combined oil scraper and compression ring.

7 Claims, 1 Drawing Sheet

TWO RING PISTON WITH LOWER TAPERED L-SHAPED RING

This is a continuation of application Ser. No. 420,379, filed Oct. 12, 1989.

The present invention relates to piston rings for internal combustion engines and compressors.

The ability to operate pistons, especially internal combustion engine pistons, with only two piston rings instead of the more usual three and to achieve acceptable oil consumption and gas blow-by levels is very advantageous in terms of piston friction reduction.

In addition to a reduction of piston friction the use of only two rings is also advantageous in reducing the compression height of the piston. Reduction in compression height may produce consequent benefits in engine height and piston weight which are also of great importance.

According to the present invention, in a piston having only two piston rings, one ring being an upper ring disposed relatively toward the upper head end of the piston, and the other ring being a lower ring disposed relatively toward the lower skirt end of the piston, the lower piston ring comprises a generally "L" shaped cross section, a first leg of the "L" lying in a generally radially directed plane and co-operating with an associated piston ring groove in the piston, the lower piston ring being supported in the piston solely by the first leg, and the second leg directed toward the lower skirt end of the piston for co-operating with an associated cylinder wall at least for the purpose of removing oil from the cylinder wall, the second leg being accommodated with clearance in a relieved part of the piston so as to lie clear of adjacent piston surfaces, and wherein the outer, generally axially directed face of the second leg cooperates with the cylinder wall in substantially uninterrupted line contact along its outer periphery and forms an angle (A) therewith of between 1° and 4° such that clearance therebetween diminishes in the direction along the second leg relatively away from the first leg, the construction and arrangement of the lower ring and the piston being such that a first turning moment is applied to the lower ring when the piston in use is descending away from the cylinder combustion chamber and an opposite turning moment is applied to the lower ring when the piston is moving toward the cylinder combustion chamber, the first turning moment being one which increases the ring side force and the pressure of said line contact, and the opposite turning moment being one which decreases the ring side force and the pressure of the line contact.

We have found that the geometry of the present lower piston ring produces advantageous changes in the forces acting thereon depending upon the direction of travel of the piston ring relative to the associated cylinder wall.

The lower piston ring may act in an exclusively oil scraping function or may act as a combined oil scraper and compression ring. Where the former is the case then the groove for the piston ring may overlap the gudgeon pin bore. Where the ring is used as a combination compression and oil scraping ring the groove must have a continuous lower radial face to prevent gas blow-by.

In order that the present invention may be more fully understood examples will now be described by way of illustration only, with reference to the accompanying drawings, of which:

FIG. 5 shows a modification of the piston ring shown in FIG. 1.

Figure 1:
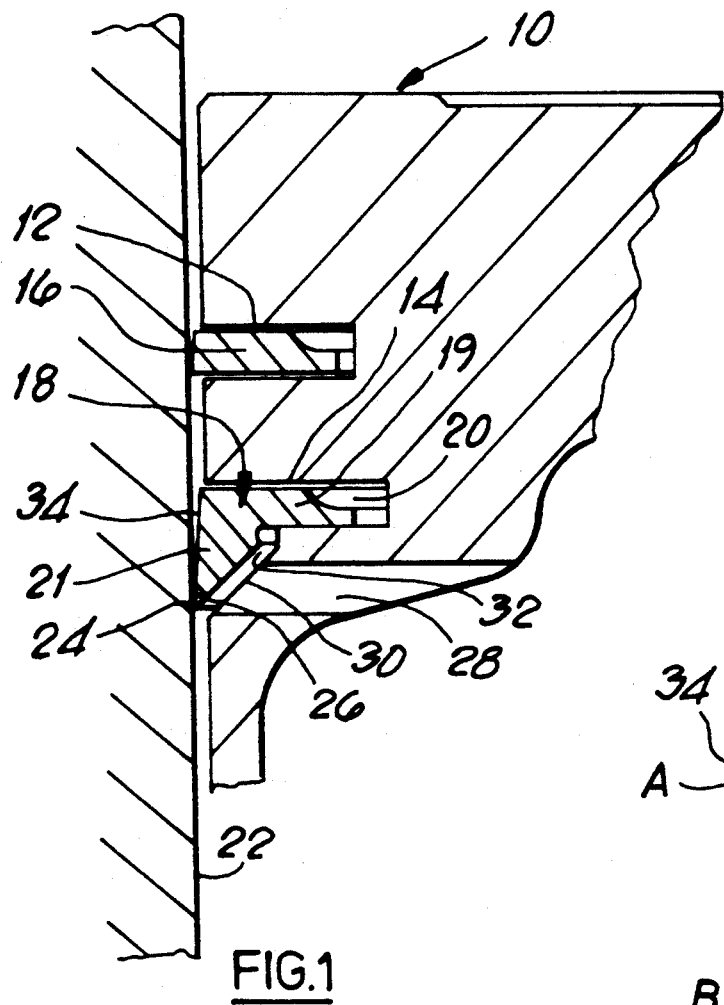
FIG. 1 shows a section through part of a piston having a piston ring according to the present invention.
Figure 2:
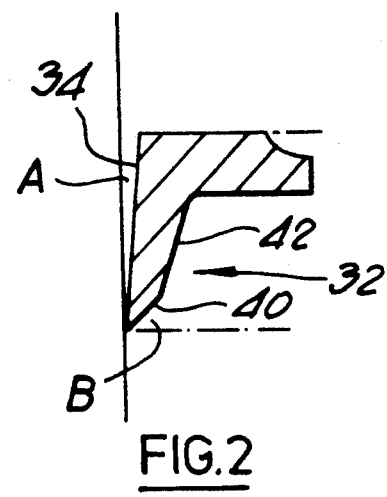
FIG. 2 shows an alternative cross sectional shape of a piston ring according to the present invention.

Referring now to FIGS. 1 and 2 and where a piston is denoted generally at 10. The piston comprises two piston ring grooves 12,14 having piston rings 16,18 received in them. The upper ring 16 may be a known compression type ring. The lower ring 18 comprises a generally "L"-shaped section. One leg 19 of the "L" co-operates with the groove 14 and has a relieved section on its upper, inner peripheral edge formed by a rabbet 20. The second leg 21 of the "L" provides the ring working face which co-operates with the engine cylinder wall 22. The ring seals against the wall 22 with line contact 24 and has a chisel edge 26. Oil drainage slots or holes 28 are provided in the piston to return oil, removed from the cylinder wall, to the engine sump. The piston wall is relieved in the area 30 to accommodate the rear face 32 of the piston ring. The angle "A" formed between the face 34 and the cylinder wall 22 may lie in the range from 1° to 4°. The angle "B" formed between the rear face 32 and a normal to the cylinder wall may lie in the range from 30° to 60°.

Angles "A" and "B" are shown in FIG. 2 which also shows an alternative form of ring where the rear face 32 is formed by two surfaces 40,42 having an obtuse included angle.

The lower edge 26 of the leg 21 need not necessarily be a chisel edge and rings having a small, flat surface 50 of less than 0.5 mm radial width have been made as shown in FIG. 5. The flat surface 50 may lie substantially normal to the cylinder wall 22.

Figure 3:
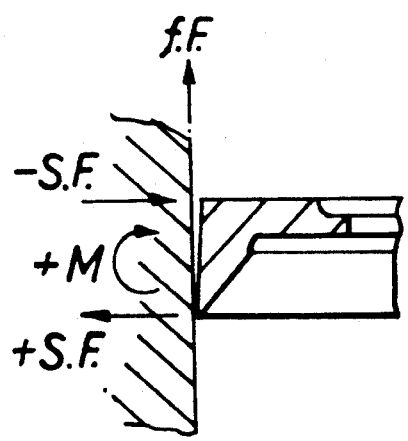
FIGS. 3 and 4 show schematically the forces acting on the piston ring when in operation.
Figure 4:
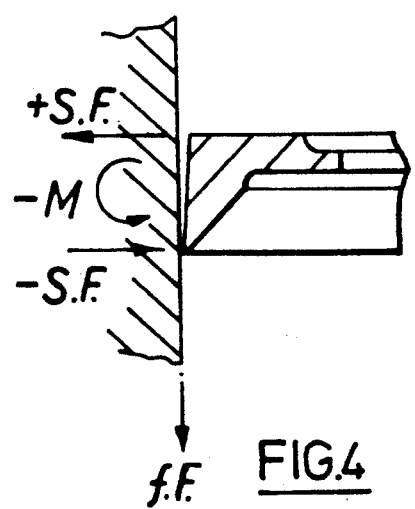

In operation, the geometry of the lower piston ring 18 produces advantageous changes in the forces acting thereon depending on the direction of travel of the piston. In FIG. 3 the piston is descending in its cylinder, the frictional force "fF" causes a turning moment in the clockwise direction which produces an increase in the side force "SF" or an increased tangential load in the ring. When the piston is rising in the cylinder, FIG. 4, "fF" is greatly reduced and a turning moment in the anti-clockwise direction is produced decreasing "SF" or the tangential load. Thus in the descending mode the piston ring works efficiently to scrape oil from the cylinder wall and to limit gas blow-by; in the ascending mode the ring slides easily over the cylinder wall and leaves any oil film in place.

I claim:

1. In combination, a piston having only two piston rings, one said ring being an upper ring disposed relatively toward the upper head end of the piston, and the other ring being a lower ring disposed relatively toward the lower skirt end of the piston, the lower piston ring comprising a generally "L" shaped cross section, a first leg of the "L" lying in a generally radially directed plane and cooperating with an associated piston ring groove in the piston, the lower piston ring being supported in said piston solely by said first leg, and the second leg directed toward the lower skirt end of the piston for co-operating with an associated cylinder wall at least for the purpose of removing oil from the cylinder wall, the second leg being accommodated with clearance in a relieved part of the piston so as to lie clear of adjacent piston surfaces, and wherein the outer, generally axially directed face of said second leg cooperates with the cylinder wall in substantially uninterrupted line contact along its outer periphery and forms an angle (A) therewith of between 1° and 4° such that clearance therebetween diminishes in the direction along said second leg relatively away from said first leg, the construction and arrangement of the lower ring and the piston being such that a first turning moment is applied to the lower ring when the piston in use is descending away from the cylinder combustion chamber and an opposite turning moment is applied to the lower ring when the piston is moving toward the cylinder combustion chamber, said first turning moment being one which increases the ring side force and the pressure of said line contact, and said opposite turning moment being one which decreases the ring side force and the pressure of said line contact.

2. A combination according to claim 1 wherein the upper, inner circumferential edge of the first leg is relieved in cross section.

3. A combination according to claim 2 wherein said relief is in the form of a chamfer of the edge or rabbet formed in the edge.

4. A combination according to claim 1 wherein the inner peripheral surface of said second leg comprises two faces having an obtuse included angle.

5. A combination according to claim 1 wherein said second leg terminates in the form of a circumferential chisel edge.

6. A combination according to claim 1 wherein said second leg terminates in a flat surface of less than 0.5 mm radial width.

7. A combination according to claim 6 wherein said flat surface is substantially normal to said associated cylinder wall.

* * * * *